US009857597B2

(12) United States Patent
Palanisamy et al.

(10) Patent No.: US 9,857,597 B2
(45) Date of Patent: Jan. 2, 2018

(54) PACKAGING BOX AS INBUILT VIRTUAL REALITY DISPLAY

(71) Applicant: Samsung Electronics Co., Ltd., Suwon-si, Gyeonggi-do (KR)

(72) Inventors: Rames Palanisamy, Bangalore (IN); Gandhi Gurunathan Rajendran, Bangalore (IN); Subramanian Ramakrishnan, Bangalore (IN); Raghu Vallikkat Thazhathethil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 15/154,542

(22) Filed: May 13, 2016

(65) Prior Publication Data
US 2016/0341966 A1    Nov. 24, 2016

(30) Foreign Application Priority Data

May 19, 2015    (IN) ...................... 2513/CHE/2015PS
Mar. 10, 2016   (IN) ...................... 2513/CHE/2015CS

(51) Int. Cl.
| B65D 85/00 | (2006.01) |
| G02B 27/01 | (2006.01) |
| B65D 81/36 | (2006.01) |
| B65D 43/02 | (2006.01) |
| B65D 5/50  | (2006.01) |
| B65D 5/68  | (2006.01) |

(52) U.S. Cl.
CPC ....... *G02B 27/0176* (2013.01); *B65D 5/5045* (2013.01); *B65D 43/02* (2013.01); *B65D 81/36* (2013.01); *B65D 5/68* (2013.01); *G02B 2027/0136* (2013.01); *G02B 2027/0181* (2013.01)

(58) Field of Classification Search
USPC ............................. 206/216, 320, 576; 345/8
See application file for complete search history.

(56) References Cited

U.S. PATENT DOCUMENTS

| 2010/0079356 A1 | 4/2010 | Hoellwarth |
| 2011/0234475 A1* | 9/2011 | Endo .................... G02B 27/017 345/8 |

(Continued)

OTHER PUBLICATIONS

"Works with Google Cardboard Manufacturer's Kit", Version 1.2—Apr. 2015, WWGC Program 1600 Amphitheatre Parkway, Mountain View, CA 94043.

*Primary Examiner* — Jacob K Ackun
(74) *Attorney, Agent, or Firm* — Jefferson IP Law, LLP

(57) ABSTRACT

A packaging box with a virtual reality (VR) display is disclosed. The packaging box with a VR display includes an outer case designed to have a nose holder and at least one strap slit, and a holder case adapted to fit inside the outer case for holding a video display device. The holder case is configured to have two view finder holes on upper surface of the holder case. The packaging box includes a nose holder at one side of the holder case which is in line with the nose holder of the outer case, and a rectangular bezel holder at bottom surface of the holder case, two eye piece holders, in symmetry with the view finder holes on the upper surface, adapted to fit on the upper surface of the holder case, each of the eye piece holder fitted with an eye piece.

7 Claims, 5 Drawing Sheets

(56) References Cited

U.S. PATENT DOCUMENTS

| | | | |
|---|---|---|---|
| 2015/0136620 A1* | 5/2015 | Williams | H05K 5/02 206/216 |
| 2015/0253574 A1* | 9/2015 | Thurber | G02B 27/0172 359/630 |
| 2016/0065952 A1* | 3/2016 | Han | H04N 13/044 345/8 |
| 2016/0066295 A1* | 3/2016 | Han | H04W 68/00 345/8 |
| 2017/0031164 A1* | 2/2017 | Costa | G02B 27/22 |

* cited by examiner

PACKAGING BOX AS INBUILT VIRTUAL REALITY DISPLAY

CROSS-REFERENCE TO RELATED APPLICATIONS

This application claims the benefit under 35 U.S.C. §119(a) of an Indian patent application filed in the Indian Intellectual Property Office on May 19, 2015 and assigned Serial No. 2513/CHE/2015(PS) and an Indian patent application filed in the Indian Intellectual Property Office on Mar. 10, 2016 and assigned Serial No. 2513/CHE/2015(CS), the entire disclosure of which is hereby incorporated by reference.

TECHNICAL FIELD

The present invention generally relates to packaging box, and more particularly relates to a packaging box as inbuilt virtual reality (VR) display.

BACKGROUND

Virtual reality (VR) environments are used in a variety of contexts including simulation, game, training, social interaction, and entertainment contexts. VR environments may be substituted for a natural environment where using a natural environment is impossible, impractical or inconvenient. In some contexts, marketing materials such as product, product packages, services, and offerings may be presented in a natural environment but mechanisms for presenting stimulus material in natural environments are limited. Furthermore, conventional systems are subject to brain pattern, semantic, syntactic, metaphorical, cultural, and interpretive errors that prevent accurate and repeatable analyses.

Using head-mounted devices, a user may view media provided by a portable electronic device. VR, which is a computer-simulated life, replicates an environment that simulates physical presence in places in the real world or imagined worlds. VR can recreate sensory experiences which include virtual taste, sight, smell, sound, and touch. For experiencing VR, the user needs 3D VR Glasses.

Currently, packaging boxes that are used for packing the mobile phones protect all the accessories including the mobile phone. The packaging boxes are strong and go unused after unpacking all the items from the box.

Thus, there is a need for efficiently utilizing the packaging boxes for serving other purposes as well.

SUMMARY

The various embodiments of the present invention disclose a packaging box as inbuilt virtual reality (VR) display. The packaging box as inbuilt VR display, comprises an outer case designed to have a nose holder and at least one strap slit, a holder case adapted to fit inside the outer case for holding a video display device, the holder case being designed to have two view finder holes on upper surface of the holder case, a nose holder at one side of the holder case which is in line with the nose holder of the outer case, and a rectangular bezel holder at bottom surface of the holder case, two eye piece holders, in symmetry with the view finder holes on the upper surface, adapted to fit on the upper surface of the holder case for customizing positioning of eyes, each of the eye piece holder fitted with an eye piece, and a box cover designed to cover the holder case in the outer case.

According to an embodiment of the present invention, the eye piece is a lens and each of the view finder holes is one of a circular shape, elliptical shape, and rectangular shape.

According to an embodiment of the present invention, the packaging box further comprises at least one strap tied to the at least one strap slit for mounting the packaging box on user's head.

According to an embodiment of the present invention, the outer case of the packaging box is designed to have at least two cuts on opposite side of the outer case and a predetermined projection placed in all the four corners, for allowing distribution of sound towards user's ear to provide better acoustics. Each of the eye piece holders is adapted to move horizontally to provide various pupillary-distances.

BRIEF DESCRIPTION OF THE DRAWINGS

The above and other objects, features and advantages of certain embodiments of the present disclosure will be more apparent to those skilled in the art from the following description of the preferred embodiment and the accompanying drawings in which.

Figure 1:
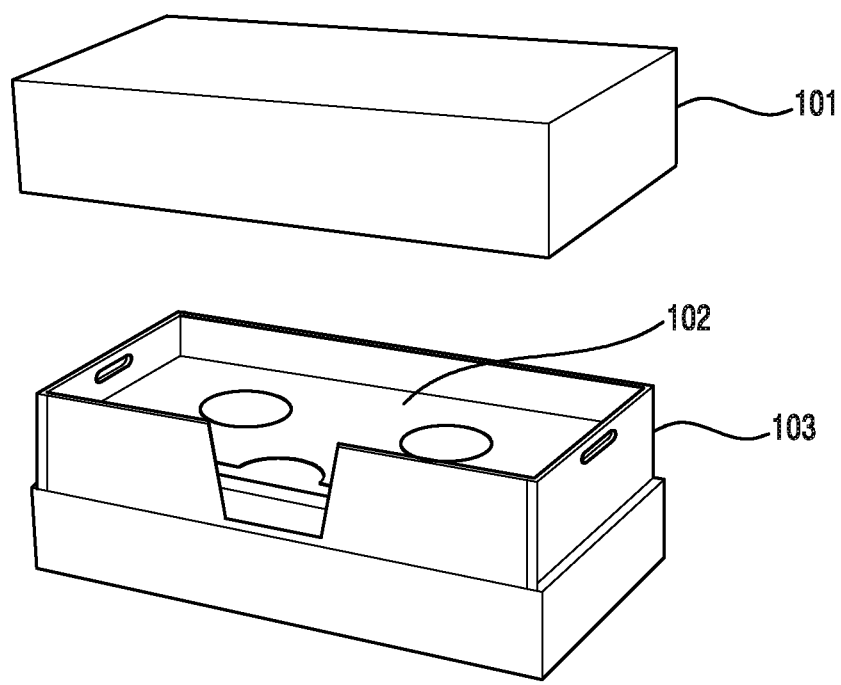
FIG. 1 is a schematic diagram representing a perspective view of a packaging box as inbuilt virtual reality (VR) display, according to an embodiment of the present invention.

Although specific features of the present invention are shown in some drawings and not in others, this is done for convenience only as each feature may be combined with any or all of the other features in accordance with the present invention.

DETAILED DESCRIPTION

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The various embodiments of the present invention disclose a packaging box as inbuilt virtual reality (VR) display. According to an embodiment of the present invention, small changes are made in the packaging box design which results in head mounted VR device to provide a simple VR experience to a user. The head mounted VR device is provided with an adjustable eye piece that lets users of any age have comfortable VR experience.

FIG. 1 is a schematic diagram representing a perspective view of a packaging box as inbuilt VR display, according to an embodiment of the present invention. According to the present invention, the head mounted packaging box as inbuilt VR display has a box cover 101 which encloses the box from the top and is placed onto an outer case 103. A holder case 102 is placed inside the outer case 103 of the head mounted VR device as shown in the FIG. 1.

Figure 2:
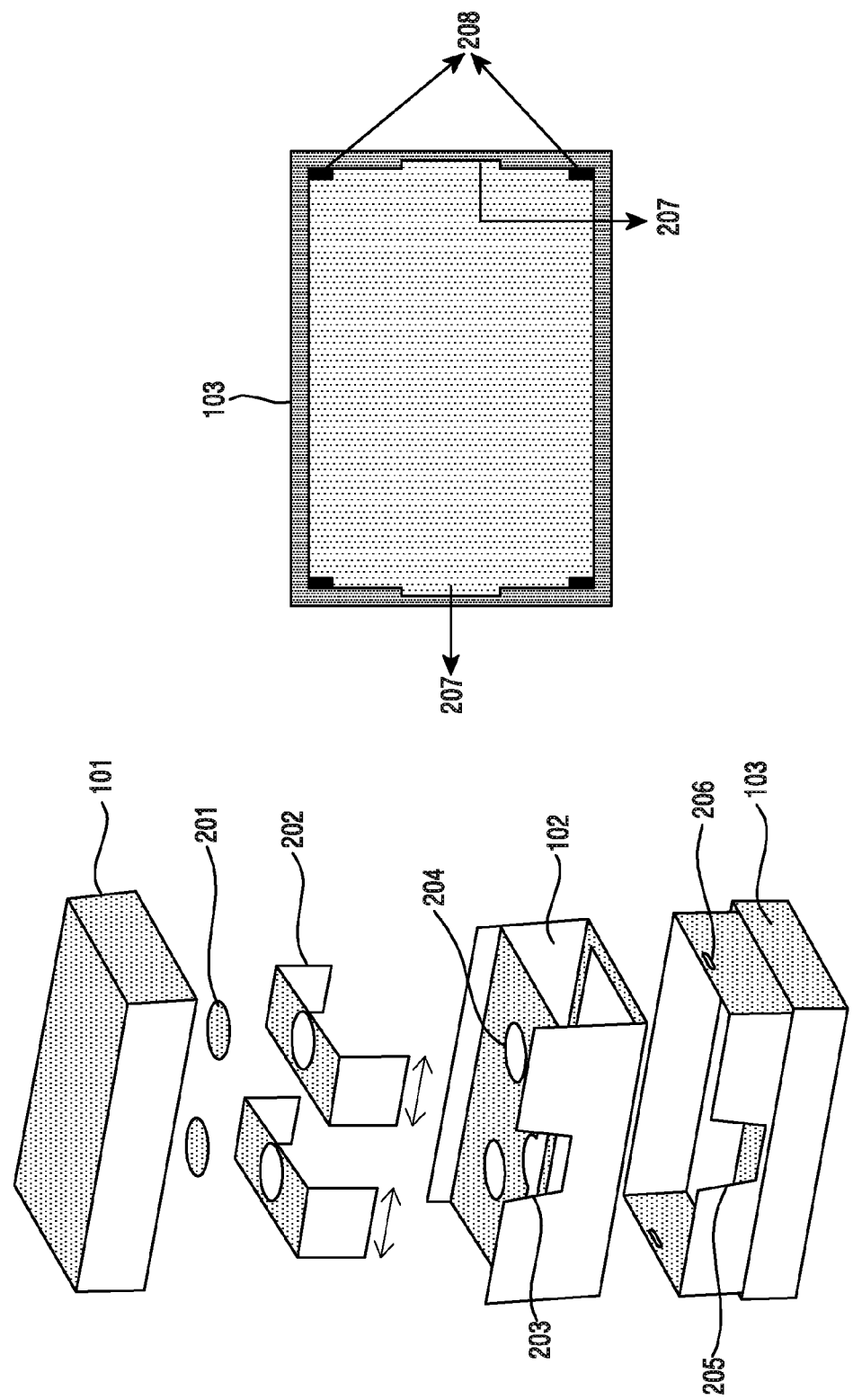
FIG. 2 is a schematic diagram representing an exploded view of the packaging box having adjustable eye piece design, according to an embodiment of the present invention.

FIG. 2 is a schematic diagram representing an exploded view of the packaging box having adjustable eye piece design, according to an embodiment of the present invention. According to the present invention, the packaging box as inbuilt VR device is equipped with the box cover 101, the holder case 102, eye pieces 201, eye piece holders 202, a nose holder 203 of the holder case 102, view finder holes 204, the outer case 103, a nose holder 205 of the outer case 103 and a strap slit 206. The outer case 103 is designed to have the nose holder 205 on one side of the outer case 103 and the strap slit 206 on two sides of the outer case 103 as shown in the FIG. 2. The outer case 103 also has at least two cuts 207 on opposite side and a predetermined projection placed in all four corners 208 to allow distribution of sound towards user's ear to provide better acoustics.

A strap is passed along the strap slit 206 and it holds the VR device in place for the user to have VR experience.

Further, the holder case 102 is adapted to fit inside the outer case 103. The holder case 102 is designed to have two view finder holes 204 on upper surface of the holder case 102 and the nose holder 203 on one side of the holder case 102 to position the nose of user. The nose holder 203 of the holder case 102 and the nose holder 205 of the outer case 103 are cut in such a way that when the holder case 102 is fit into the outer case 103, they are in line with each other as shown in FIG. 1. The holder case 102 is fitted with the two adjustable eye piece holders 202 that are in symmetry with the view finder holes 204 of the holder case 102. The two adjustable eye piece holders 202 allow the user of any age to use the VR device comfortably and with ease. Each of the eye piece holders 202 is fitted with each of the eye pieces 201. The box cover 101 is placed onto the outer case 103 to enclose the holder case 102 that is fitted into the outer case 103.

Figure 3:
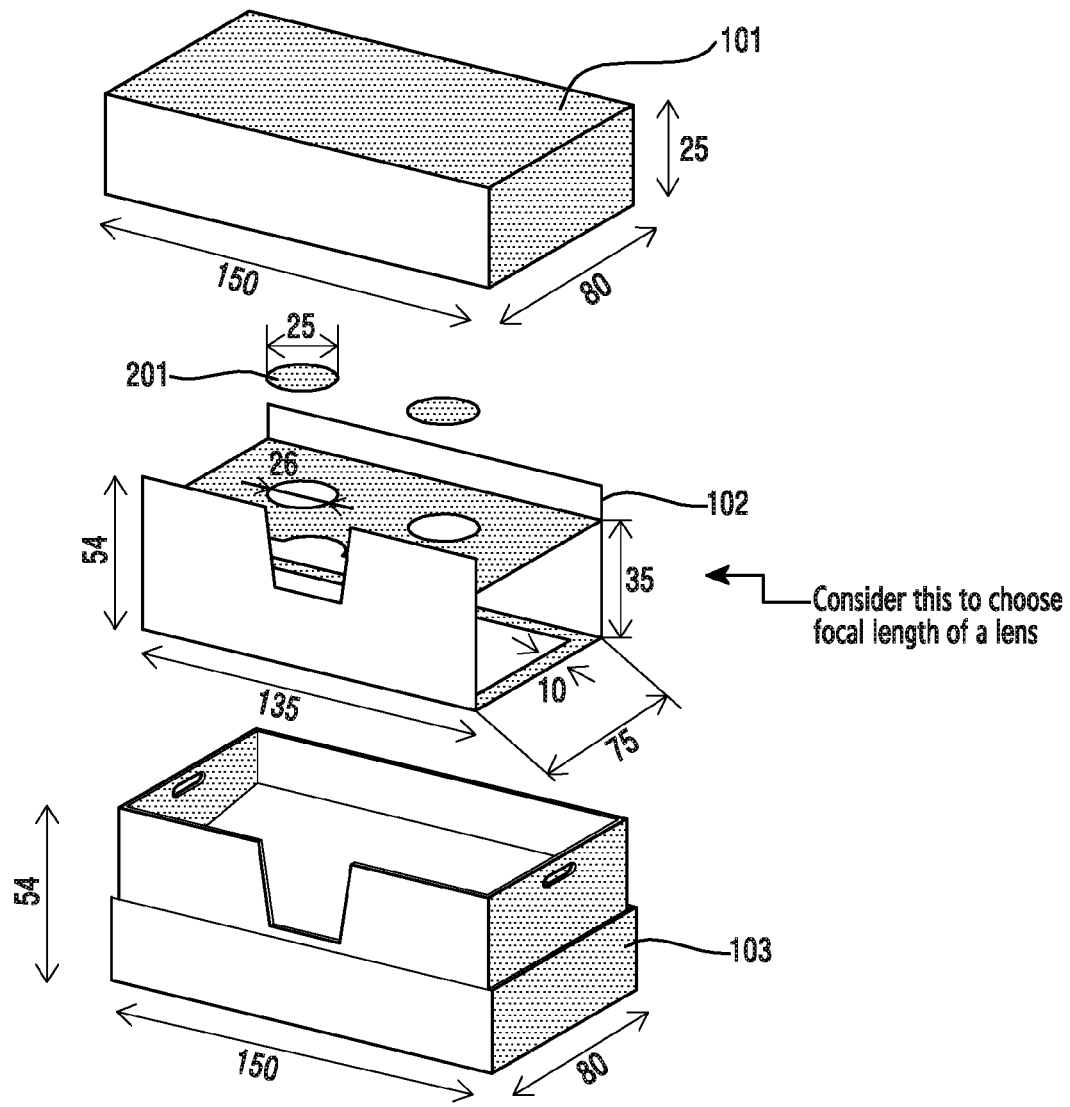
FIG. 3 is a schematic diagram representing exploded view of the packaging box, according to one embodiment of the present invention.

FIG. 3 is a schematic diagram representing exploded view of the packaging box, according to one embodiment of the present invention. According to an exemplary embodiment of the present invention, the dimensions of the packaging box are disclosed for the purpose of better illustration. The packaging box in dimensions is illustrated as follows. The holder case 102 is 135 mm in length, 75 mm in width and 54 mm in height. The height of the upper surface of the holder case 102 is 35 mm from the bottom surface of the holder case 102. This length could be considered to choose focal length of lens. The two view finder holes 204 on upper surface of the holder case 102 are 26 mm in diameter. The eye pieces 201 are 25 mm in diameter so as to fit them onto the eye piece holders 202 which are similar in diameter as the view finder holes 204.

Further, the holder case 102 is fitted into the outer case 103 whose dimensions are 150 mm in length, 80 mm in width and 54 mm in height. The height 54 mm of the holder case 102 is similar to the height 54 mm of the outer case 103 so as to fit the holder case 102 into the outer case 103. The box cover 101 is placed onto the outer case 103 to enclose the holder case 102. The box cover 101 is 150 mm in length, 80 mm in width and 25 mm in height.

Figure 4:
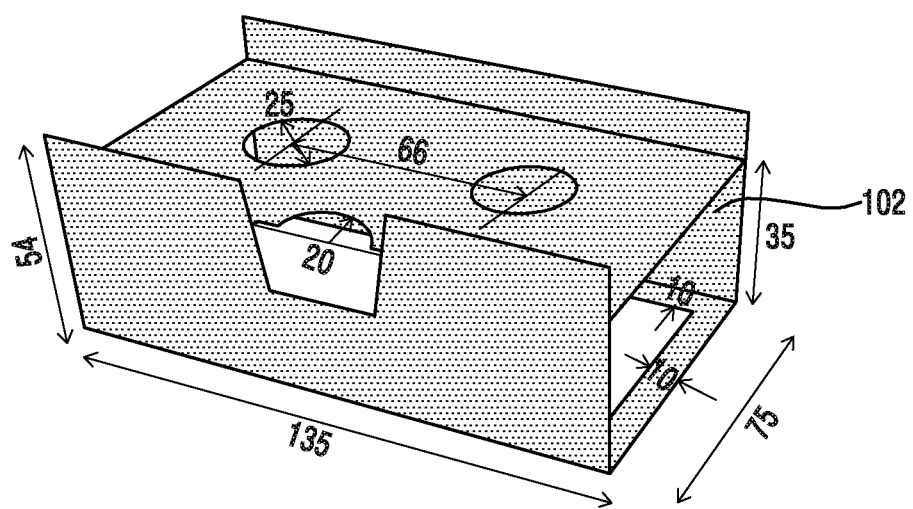
FIG. 4 is a schematic diagram representing top portion of the holder case, according to one embodiment of the present invention.

FIG. 4 is a schematic diagram representing top portion of the holder case, according to one embodiment of the present invention. According to an exemplary embodiment of the present invention, the dimensions of the holder case 102 are disclosed in detail for the purpose of better illustration. The holder case 102 is 135 mm in length, 75 mm in width and 54 mm in height. The height of the upper surface of the holder case 102 is 35 mm from the bottom surface of the holder case 102. This length could be considered to choose focal length of lens. The two view finder holes 204 on upper surface of the holder case 102 are 25 mm in diameter. The distance between both the view finder holes 204 is 66 mm The distance provided by a circular cut for holding the nose of the user is 20 mm in radius.

Figure 5:
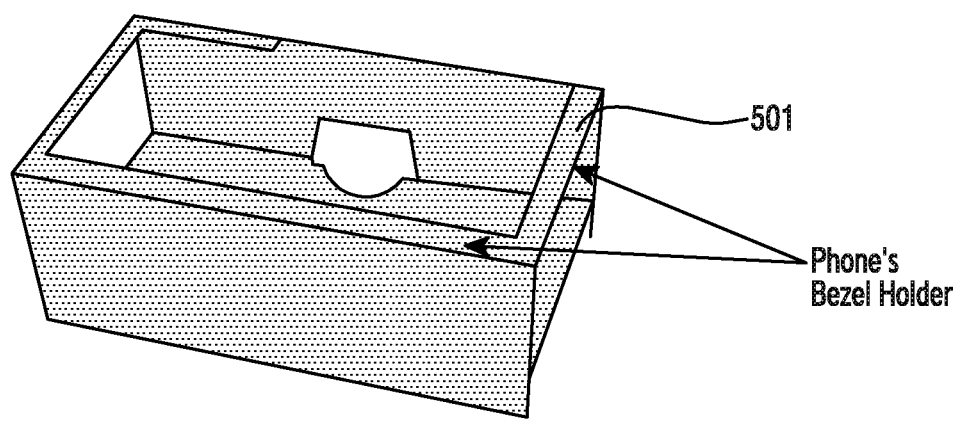
FIG. 5 is a schematic diagram representing bottom portion of the holder case, according to one embodiment of the present invention.

FIG. 5 is a schematic diagram representing bottom portion of the holder case, according to one embodiment of the present invention. According to the present invention, the bottom portion of the holder case 102 is for holding the phone's bezel as shown in the FIG. 5. The width of the phone's bezel holder 501 is 10 mm as shown in FIG. 4.

Although the invention of the packaging box as inbuilt VR display has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

What is claimed is:

1. A packaging box with a virtual reality (VR) display, comprising:
   an outer case designed to have a nose holder and at least one strap slit;
   a holder case adapted to fit inside the outer case for holding a video display device, the holder case being designed to have two view finder holes on upper surface of the holder case, a nose holder at one side of the holder case which is in line with the nose holder of the outer case, and a bezel holder at bottom surface of the holder case;
   two eye piece holders, in symmetry with the view finder holes on the upper surface, adapted to fit on the upper surface of the holder case for customizing positioning of eyes, each of the eye piece holders fitted with an eye piece; and a box cover designed to cover the holder case in the outer case.

2. The packaging box of claim 1, wherein the eye piece is a lens.

3. The packaging box of claim 1, wherein each of the view finder holes is one of a circular shape, elliptical shape, and rectangular shape.

4. The packaging box of claim 1, further comprising at least one strap tied to the at least one strap slit for mounting the packaging box on user's head.

5. The packaging box of claim 1, wherein the outer case of the packaging box is designed to have at least two cuts on opposite side of the outer case and a predetermined projection placed in all four corners, for allowing distribution of sound towards user's ear to provide better acoustics.

6. The packaging box of claim 1, wherein each of the eye piece holders is adapted to move horizontally to provide various pupillary-distances.

7. The packaging box of claim 1, wherein the bezel holder is a rectangular shape.

\* \* \* \* \*